Dec. 15, 1959 C. BODENSTEIN 2,917,250

APPARATUS FOR MAGNETICALLY STORING TELEGRAPH SIGNALS

Filed May 20, 1955 2 Sheets-Sheet 1

Inventor:
Camillo Bodenstein.
By [signature] Atty.

APPARATUS FOR MAGNETICALLY STORING TELEGRAPH SIGNALS

Filed May 20, 1955 2 Sheets-Sheet 2

Inventor:
Camillo Bodenstein

By [signature] Att'y.

2,917,250

APPARATUS FOR MAGNETICALLY STORING TELEGRAPH SIGNALS

Camillo Bodenstein, Munich, Germany, assignor to Siemens & Halske Aktiengesellschaft, Munich and Berlin, Germany, a corporation of Germany Application May 20, 1955, Serial No. 509,997
In Germany September 21, 1949

Public Law 619, August 23, 1954
Patent expires September 21, 1969

9 Claims. (Cl. 242—55.12)

This invention relates to apparatus for magnetically storing symbol element combinations such as telegraph signals, and is particularly concerned with a step-by-step or start-stop feed device for magnetic record carriers comprising recording and/or reproduce means disposed within the zone of the start-stop feed and having an area ahead of such zone in which the record carrier is slackened.

The general requirement relative to record carriers, for example, in optical or in magnetic systems is that they should be advanced at the recording and the reproduce points at a predetermined accurately maintained speed. There may however be situations in which such a uniform motion is unsuitable, for example, when impulses or telegraph signals are to be recorded on a tape. In a telegraph transmitter, a uniformly operating feed or transport of the record carrier would produce space signals which must be avoided.

The invention proposes to dispose the recording point for these reasons within the zone of a step-by-step or start-stop feed for the record carrier, and since such a stepwise feed is not feasible where relatively large masses are suddenly accelerated and retarded, the invention proposes further to dispose ahead of the stepwise feed an area in which the record carrier is slackened.

The apparatus according to the invention has the advantage of stepwise respectively accelerating and retarding only the portion of the record carrier coming at any instant within the operatively effective zone without in any way causing parts with relatively great mechanical inertia, for example, a feed reel, to partake in the stepwise motion with the same precision with respect to acceleration and retardation required for the motion of the operatively effective portion of the carrier in the recording and/or reproduce zone.

The invention may be realized, for example, by storing the record carrier in loose undulations or turns in a suitable receptacle from which it may be drawn stepwise as may be required. Only part of the record carrier may be stored in the receptacle, with the remaining part coiled, for example, on reels, and the invention therefore provides for automatically replenishing the contents of the receptacle.

The record carrier may be arranged on spaced apart reels in a manner customary in tape recorders but may also be of the endless type with part thereof contained in the receptacle and a portion disposed for cooperation with the record and eraser heads, respectively.

In using a tapelike carrier, several sound tracks may be provided thereon alongside each other. In order to reduce the transition interval from one to the other sound track, the arrangement may be such as to record on one track in one direction of motion of the tape and to record or reproduce on the next adjacent track upon moving the carrier in opposite direction. In the latter case, there may be provided two record receptacles on each side of the operating zone containing, for example, record and eraser heads.

In accordance with the invention, in an arrangement avoiding the storage of the record carrier in a receptacle, there may be provided a supply reel and a storage reel of the customary kind. There is, however, a difference as compared with customary arrangements using supply and storage reels, in that the supply reel is in accordance with the invention a driven reel which is operated in such a manner that the record carrier is fed to the zone of the stepwise transport means without tension. The record carrier may be driven and drawn from the supply reel by a pair of rollers between which it is clamped. However, the drive must in such a case be controlled in accordance with the requirements of the stepwise transport zone.

This might for example be accomplished by the provision of a pair of drive rollers which are always switched in for the duration of the stepwise transport of the record carrier. Such arrangement would however introduce the danger of mechanically overstressing the record carrier incident to sudden pull thereon due to the inertia of the supply reel.

It is therefore advantageous to provide a correctly dimensioned drive for the supply reel which may be obtained by the provision of a drive force for the reel operating in step or rhythm with the step-by-step transport. Since the diameter of the carrier coiled on the supply reel diminishes progressively with progressing operation, it is necessary to increase progressively the angular displacement of the supply reel corresponding to the requirements of the stepwise feed or transport.

This is in accordance with the invention obtained by maintaining constant the length of carrier fed from the supply reel for each drive step. For this purpose, there may for example be provided a feeler in engagement with the carrier coiled on the supply reel which controls the operation of the corresponding drive.

The storage reel may be driven over a slip clutch in such a manner that a feed or transport of the tape is effected only when the device for the stepwise transport cooperates in correct sense. Only small discrepancies need in such case be equalized by the slip clutch.

It is advantageous to provide an individual drive also for the storage reel and to control such drive so that it is operatively effective in rhythm with the stepwise feed at the recording or reproduce zone of the record carrier. The inertia of the storage reel requires slower starting and running, and there is accordingly advantageously provided a resilient intermediate member, for example, a helical spring, between the drive effected in rhythm with the stepwise feed and the storage reel, such spring being stepwise tensioned by the drive force, and the force stored in the spring being transmitted to the storage reel even after conclusion of a feed step.

In the case of structures providing for multi-track recording and accordingly use of the record carrier in each direction of motion thereof, the parts should be arranged symmetrically with respect to the two reels acting alternatively respectively as supply and as storage reels and having consequently a drive associated therewith acting in either direction of motion.

The above indicated and further objects and features will appear from the description which is rendered below with reference to the accompanying diagrammatic drawing wherein Fig. 1 is a schematic view of one embodiment;

The drawings are schematic and show only the parts required for an understanding of the invention. Such parts are, of course, susceptible of changes in details as well as in cooperation thereof with other parts.

Figures 1, 2:
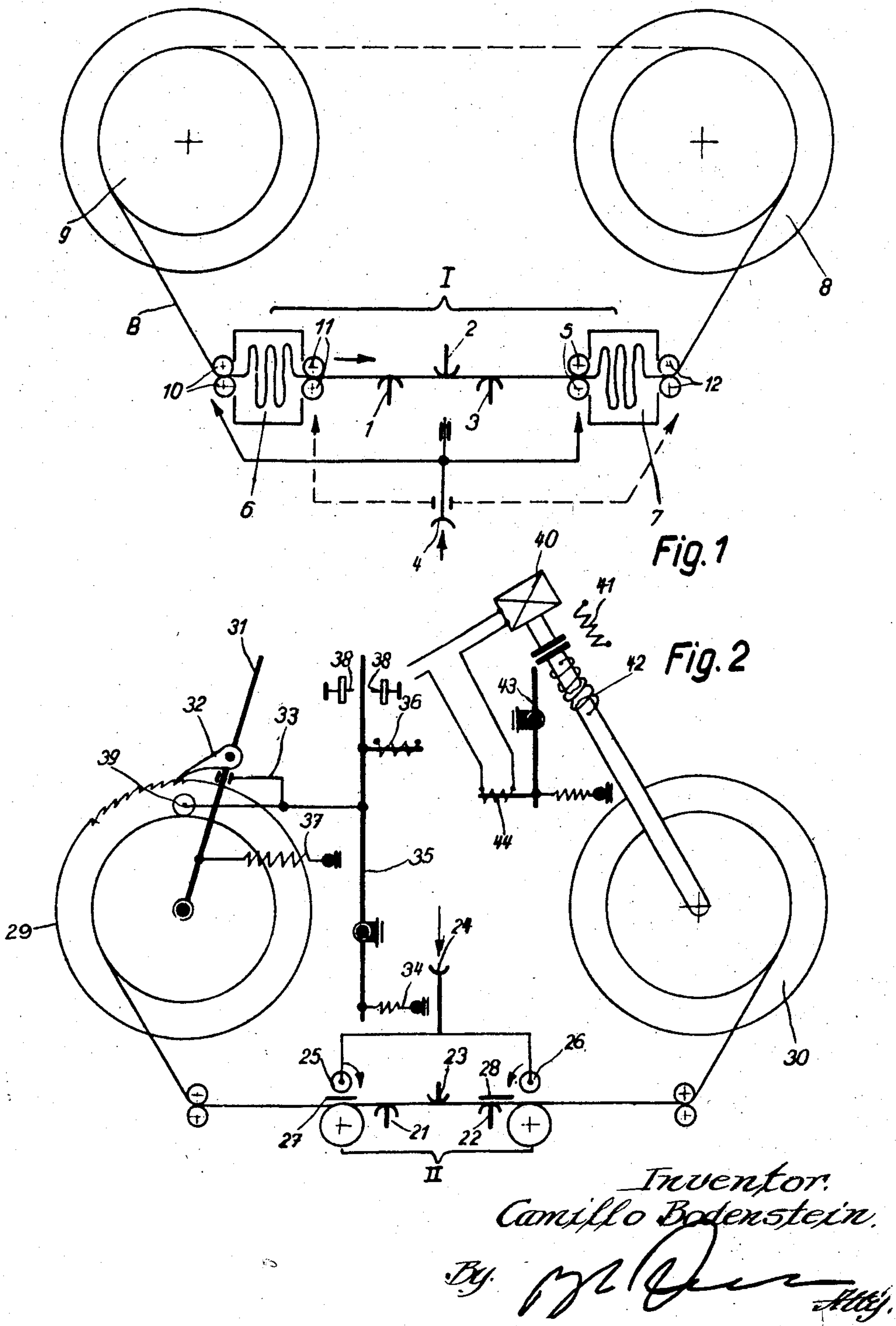
Fig. 2 is a schematic view of another embodiment of the invention.
Figure 3:
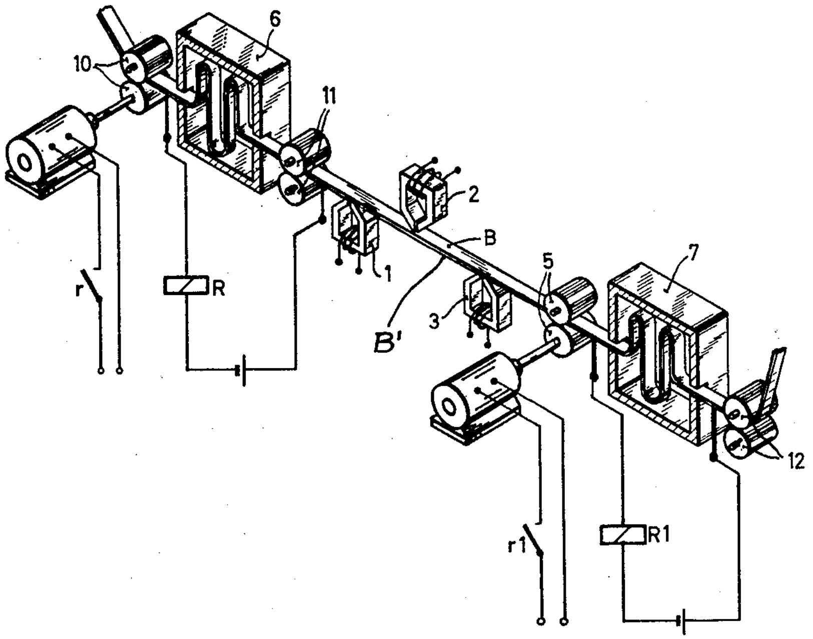
Fig. 3 is a perspective view of the arrangement according to Fig. 1 and including means for supervising the operation thereof.

In the magnetic recorder apparatus shown in Figs. 1 and 3, reference character B indicates a tapelike record carrier which may be moved, for example, in the direction of the arrow shown at the right of the element marked by numeral 11. Numerals 1 and 3 indicate, for example, erase heads and 2 may be a record and/or reproduce head. The erase head 1 and the reproduce head 2 will be operative in a recording operation upon motion of the record carrier in the indicated direction.

It shall be assumed that it is desired to record on the tape impulses so as to use it, for example, in place of a perforated tape in telegraphy. Exactly as in the case of a perforated tape, there is posed the requirement according to which the individual impulses or impulse combinations should occupy only a predetermined length of the tape and that the spacing with respect to the next successive signal should be short, regardless of whether such signal is transmitted after a long or a short interval after the transmission of the preceding signal. It is accordingly necessary that the tape be transported or fed intermittent or stepwise at least within the zone I.

This stepwise feed may be effected, as schematically indicated in the drawing, responsive to actuation of a switch or key 4, manually or automatically, to cause a pair of drive rollers 5 to pull the tape from the left to the right. The tape is thereby pulled out from the storage receptacle 6 containing a sufficient length thereof in the form of loose undulations. The tape is by the action of the rollers 5 introduced into a receptacle 7 which may be similar to the receptacle 6.

It is however possible to omit the receptacle 7 and to wind the tape with a slight pull upon a suitable storage reel. The drive for such reel must not transport the tape in the stop position of the stepwise drive within the zone I.

In case of using an endless tape—a magnetic wire record carrier may, of course, be employed—the reel 8 and likewise the reel 9 will be operative as reversal reels, a pair of rollers 10 being provided for reintroducing the record carrier B into the storage receptacle 6. In order to assure storage of a sufficient length of tape within the receptacle 6, the rollers 10 are in rhythm of the tape transport actuated simultaneously with the rollers 5 so that a length of tape is fed at the left into the receptacle 6 corresponding to the length removed therefrom at the right thereof. The cooperation of the rollers 5 and 10 is indicated by the full line extending therebetween and carrying arrows pointing to these rollers.

The use of two erase heads 1 and 3 and the use of two receptacles 6 and 7 makes it possible to transport the tape in either one of two opposite directions. Movement of the tape in a direction opposite to that described above will be initiated responsive to actuation of the switch or key 4 as before, causing actuation of drive rollers 11 for pulling a length of tape from the receptacle 7 and coincident actuation of roller 12 (see dotted connecting line) for introducing an equivalent length of tape into the receptacle 7 in the same manner as described in connection with the operation of the rollers 5 and 10.

The length of tape contained in the receptacles 6 or 7 may be supervised by suitable relay means which becomes operable responsive to insufficient tape in either respectacle so as to initiate replenishment of the corresponding tape length. For example, if a predetermined length of tape is available in the receptacle 6, the relay R opens contact *r* to inactivate the rollers 10. The tape may advantageously carry a metallic coating B' (Fig. 3) edgewise thereof or upon one side thereof. The circuit of the relay includes contacts as shown, for engagement with the metallized coating and its operation will then be pend upon the resistance of the length of the coating between two points, for example, between the pair of rollers 10 and 11. A similar arrangement comprising a relay R1 controlling contact *r1*, in a circuit including contacts in engagement with the metallic coating B' on the record carrier, is provided for inactivating rollers 5 in the presence of a predetermined length of carrier within the receptacle 7. In case of a record carrier of the wire type, its resistance may be used for controlling the relay.

In the embodiment shown in Fig. 2, the tape is tensioned within the zone II and is moved relative to two erase heads 21 and 22 and a record or reproduce head 23. Within this zone, the tape is to be moved stepwise. Upon depression of a key 24 (corresponding to start key 4 in Fig. 1) two drive rollers 25 and 26 will be simultaneously pressed against the tape. These rollers are by suitable means (not shown) rotated in opposite directions but only one of such rollers will at any time be operatively effective due to the provision of blocking members 27 and 28 which are by suitable means mechanically interlinked, one or the other of such blocking members being shifted between the record carrier and its respectively associated roller. As shown in Fig. 2, the blocking member 27 has been shifted to disposed it underneath its associated roller 25 while the blocking member 28 has been at the same time removed from underneath its associated roller 26. Accordingly, the roller 26 will become effective to move the tape. The corresponding device consequently permits a switching over from one to the other direction of transport motion of the tape.

In case of a multi-track tape, suitable known means (not shown) may be provided for moving the record head 23 laterally in accordance with the track employed.

The roller 25 or 26, whichever may be effective, moves the tape stepwise in a predetermined direction. Each individual step is of a predetermined duration which may be, in telegraph operation, for example, 20 milliseconds, thus requiring for a signal with the start and stop impulse a total of seven times of such step duration or 140 milliseconds. The space interval to the next successive signal transmission amounts as usual to 30 milliseconds. During the operating time of a signal (140 milliseconds) there will be effected a uniform transport of the tape either by the roller 25 or by the roller 26. There will follow a stop interval of 30 milliseconds and thereafter transmission of the next successive signal.

The spacing between two signals may be greater incident to recording and it is for this reason impossible to specify a mean transport speed for the tape from the supply reel 29 to the storage reel 30 and vice versa. The inertia of two reels is on the other hand too great for maintaining the tape tension over the entire length from the supply to the storage reel as may be otherwise done in magnetic sound systems.

In order to carry out the intermittent stepwise feed or transport of the tape within the zone II without being handicapped by the inertia of the supply reel 29 (assuming transport of the tape from left to right as seen in the drawing) such supply reel is provided with its own drive as compared with the customary practice which provides for a braking force therefor.

As shown in Fig. 2, the invention provides for the drive of the supply reel 29 a stepping mechanism comprising a lever 31 carrying a pawl 32 for engagement with ratchet teeth carried upon the rim of the reel. The pawl is driven by a plunger 33 which engages the lever 31 due to the action of a spring 34 acting upon a pivoted double armed lever 35 to which the plunger 33 is suitably linked. An electromagnet 36, for example, a solenoid, is provided, for retracting the lever 35 upon energization, so as to retract the plunger 33 accordingly. The solenoid 36 is, for example, in suitable known manner actuated responsive to operation of the key 24. The spring 37 thereupon restores the lever 31 into its initial position and upon deenergization of the solenoid 36, the spring 34 moves the lever 35 again counterclockwise, thereby angularly displacing the supply reel. The amount of angular displacement effected depends on the adjustment of two adjustable stops 38 and further upon the position of a feeler roller 39 which is resiliently connected with the plunger 33 and in engagement with the coil of the tape upon the supply roller. As the diameter of the tape coil on the reel 29 decreases, the feeler roller 39 will drop, thereby causing radial inward displacement of the plunger 33 on the lever 31 correspondingly nearer to the pivot of the lever 31. The angular feed displacement of the reel 29 will consequently increase with decreasing diameter of the tape coil thereon. The resulting operation assures uniform length of tape released with each step executed by the tape within the zone II. The tape accordingly remains slackened between the supply reel and the inlet to the zone II.

The storage reel 30 is likewise driven in accordance with the intermittent or stepwise transport within the zone II, for example, by an individual motor 40 which is operated continuously so long as the reel 30 functions as a storage reel. Such motor will be coupled with the storage reel only responsive to actuation of a magnetic clutch 41 which may be disposed in a circuit in parallel with the solenoid 36 of the supply reel. Between the magnetic clutch and the reel 30 there is disposed a power storing element, for example, a coiled spring 42. As soon as the magnetic clutch 41 is switched in, the spring 42 will be somewhat tensioned; a retainer pawl 43 actuated by a magnet 44 maintains this condition responsive to deenergization of the clutch magnet, thus giving the storage reel 30 time to receive the length of the record carrier to be stored thereon.

The magnetic clutch device becomes inactive upon change of the direction of tape transport. The motor and the magnet 44 are at such time disconnected, the magnet 44 deenergizing to release the pawl 43.

The reels 29 and 30 are each provided with a drive device for the supply operation, one or the other of such devices becoming operative depending upon the switching in of either the drive roller 25 or the drive roller 26, that is, depending on which of the stepwise transport or feed devices has been switched in for operation.

Known and suitable means may be employed throughout for realizing the various operations in accordance with the intents and purposes of the invention as described above and as defined in the appended claims. Details of such means have accordingly been omitted from the drawings to keep them simple.

Changes and modifications may likewise be made within the scope and spirit of the appended claims.

I claim:

1. Apparatus for magnetically storing symbol element combinations, such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier for respectively receiving portions of said carrier disposed in loose undulations, control means for feeding portions of said carrier into said receptacles disposed respectively ahead of and in back of said zone of intermittent motion for replenishing the supply of undulating carrier portions therein, a supply reel and a storage reel for said carrier, and means controlled by said drive means for intermittently moving said carrier within said zone for driving said supply reel to replenish a portion of said carrier within the corresponding receptacle in accordance with amounts of said carrier withdrawn intermittently from said receptacle.

2. Apparatus for magnetically storing symbol element combinations, such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier for respectively receiving portions of said carrier disposed in loose undulations, control means for feeding portions of said carrier into said receptacles disposed respectively ahead of and in back of said zone of intermittent motion for replenishing the supply of undulating carrier portions therein, a supply reel and a storage reel for said carrier, means controlled by said drive means for intermittently moving said carrier within said zone for driving said supply reel to replenish a portion of said carrier within the corresponding receptacle in accordance with amounts of said carrier withdrawn intermittently from said receptacle, switching means for controlling the direction of motion of said carrier along said zone, and means controlled by said switching means for governing the drive means for said supply reel.

3. Apparatus for magnetically storing symbol element combinations, such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier for respectively receiving portions of said carrier disposed in loose undulations, control means for feeding portions of said carrier into said receptacles disposed respectively ahead of and in back of said zone of intermittent motion for replenishing the supply of undulating carrier portions therein, a supply reel and a storage reel for said carrier, means controlled by said drive means for intermittently moving said carrier within said zone for driving said supply reel to replenish a portion of said carrier within the corresponding receptacle in accordance with amounts of said carrier withdrawn intermittently from said receptacle, switching means for controlling the direction of motion of said carrier along said zone, means controlled by said switching means for governing the drive means for said supply reel, and power storing means cooperating with the drive means for said storage reel.

4. Apparatus for magnetically storing symbol element combinations, such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier for respectively receiving portions of said carrier disposed in loose undulations, control means for feeding portions of said carrier into said receptacles disposed respectively ahead of and in back of said zone of intermittent motion for replenishing the supply of undulating carrier portions therein, and relay means controlled by the resistance of a length of said carrier for governing the operation of said control means.

5. Apparatus for magnetically storing symbol element combinations, such as telegraph signals, consisting of groups of impulses, comprising a magnetizable electrically normally non-conductive carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier ofr respectively receiving portions of said carrier disposed in loose undulations, control means for feeding portions of said carrier into said receptacles disposed respectively ahead of and in back of said zone of intermittent motion for replenishing the supply of undulating carrier portions therein, a metallic coating on said carrier, relay means controlled by the resistance of a length of said metallic coating for governing the operation of said control means, and circuit means including said coating for governing the operation of said relay means.

6. Apparatus for magnetically storing symbol element combinations such as telegraph signals, consisting of groups of impulses, comprising a magnetizable multitrack carrier, a magnetic head, alternatively operable drive means for alternatively intermittently moving said carrier at uniform speed relative to said head along a predetermined zone selectively in one or the other of two directions of motion only for the duration of the respective groups of impulses representing respectively symbol element combinations, and means for disposing portions of said carrier in loose undulations at each end of the zone of intermittent motion thereof.

7. Apparatus for magnetically storing symbol element combinations such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, feeding means for feeding said carrier to said zone of intermittent motion, means for disposing a portion of said carrier in loose undulations ahead of the zone of intermittent motion, and a receptacle for receiving the undulations of said carrier disposed between said feeding means and the corresponding end of said zone of intermittent motion.

8. Apparatus for magnetically storing symbol element combinations such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, and a receptacle at each end of said zone of intermittent motion of said carrier for respectively receiving substantially constant portions of said carrier disposed in loose undulations.

9. Apparatus for magnetically storing symbol element combinations such as telegraph signals, consisting of groups of impulses, comprising a magnetizable carrier, a magnetic head, drive means for intermittently moving said carrier along a predetermined zone at uniform speed relative to said head only for the duration of the respective groups of impulses representing respectively symbol element combinations, means for disposing a portion of said carrier in loose undulations ahead of the zone of intermittent motion thereof, a receptacle at each end of said zone of intermittent motion of said carrier for respectively receiving substantially constant portions of said carrier disposed in loose undulations, and control means for feeding portions of said carrier into said receptacles disposed respectively ahead of and in back of said zone of intermittent motion for replenishing the supply of undulating carrier portions therein.

References Cited in the file of this patent

UNITED STATES PATENTS

| | | |
|---|---|---|
| 688,648 | Kayser | Dec. 10, 1901 |
| 1,172,733 | Raber | Feb. 22, 1916 |
| 2,071,192 | Younts | Feb. 16, 1937 |
| 2,259,517 | Drenkard | Oct. 21, 1941 |
| 2,310,947 | Fischer | Feb. 16, 1943 |
| 2,365,691 | Fodor | Dec. 26, 1944 |
| 2,436,821 | Nordquist | Mar. 2, 1948 |
| 2,554,794 | Potts | May 29, 1951 |